United States Patent
De Rosa et al.

(10) Patent No.: US 9,451,122 B2
(45) Date of Patent: Sep. 20, 2016

(54) SYSTEM AND METHOD FOR SHARING PHOTOGRAPHIC CONTENT

(71) Applicant: Socialmatic LLC, Henderson, NV (US)

(72) Inventors: Antonio De Rosa, Cava de' Tirreni (IT); Artem Shishakin, Samara (RU)

(*) Notice: Subject to any disclaimer, the term of this patent is extended or adjusted under 35 U.S.C. 154(b) by 0 days.

(21) Appl. No.: 14/023,887

(22) Filed: Sep. 11, 2013

(65) Prior Publication Data

US 2014/0313352 A1 Oct. 23, 2014

Related U.S. Application Data

(60) Provisional application No. 61/814,366, filed on Apr. 22, 2013.

(51) Int. Cl.
 *H04N 1/32* (2006.01)
 *H04N 1/21* (2006.01)

(52) U.S. Cl.
 CPC ........ *H04N 1/32133* (2013.01); *H04N 1/2154* (2013.01); *H04N 2201/3205* (2013.01); *H04N 2201/3269* (2013.01); *H04N 2201/3271* (2013.01); *H04N 2201/3276* (2013.01)

(58) Field of Classification Search
 CPC .................................................... H04N 1/2154
 See application file for complete search history.

(56) References Cited

U.S. PATENT DOCUMENTS

| | | | |
|---|---|---|---|
| 2002/0044198 A1* | 4/2002 | Miyazaki | B41J 3/445 347/248 |
| 2003/0184815 A1* | 10/2003 | Shiki et al. | 358/453 |
| 2010/0191772 A1* | 7/2010 | Brown | G06Q 10/10 707/796 |
| 2010/0321739 A1* | 12/2010 | Amagai | 358/3.28 |
| 2012/0120186 A1* | 5/2012 | Diaz et al. | 348/36 |
| 2012/0206603 A1* | 8/2012 | Rekimto et al. | 348/156 |
| 2013/0043302 A1* | 2/2013 | Powlen et al. | 235/375 |

\* cited by examiner

*Primary Examiner* — Mark Monk
(74) *Attorney, Agent, or Firm* — Lombard & Geliebter LLP; Antonio Papageourgiou, Esq.

(57) ABSTRACT

A method and system for sharing photographic content, the method comprising capturing an image on a processing device. A photograph is generated, via the processing device, from the image. Metadata of a user is associated with the photograph and a scannable code corresponding to the metadata is generated. The method further comprises printing, via the processing device, the photograph including the scannable code and an identification of the user on a given social networking site.

15 Claims, 12 Drawing Sheets

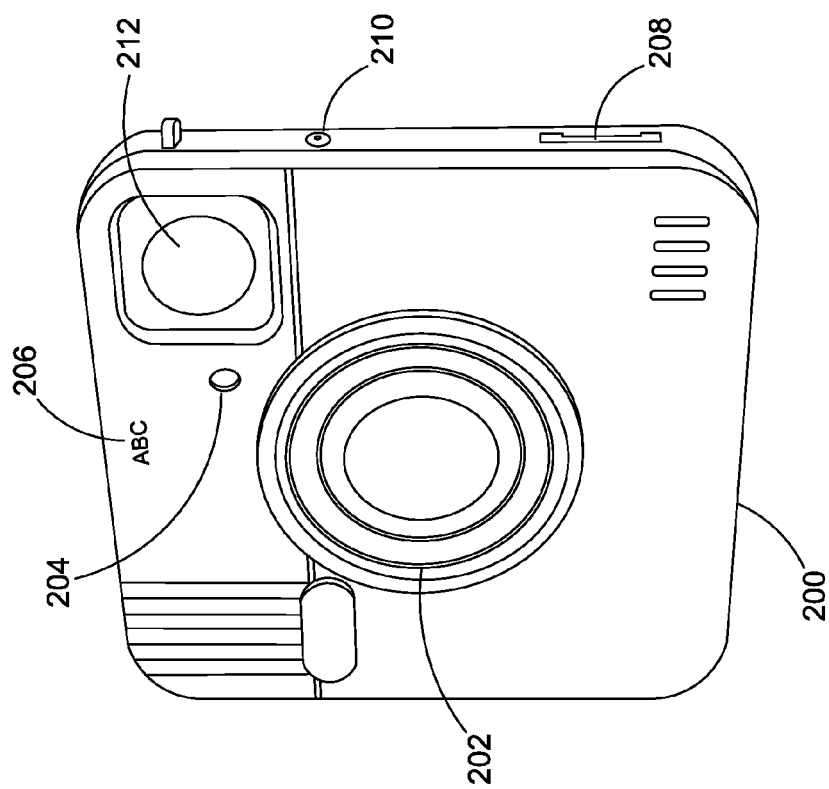

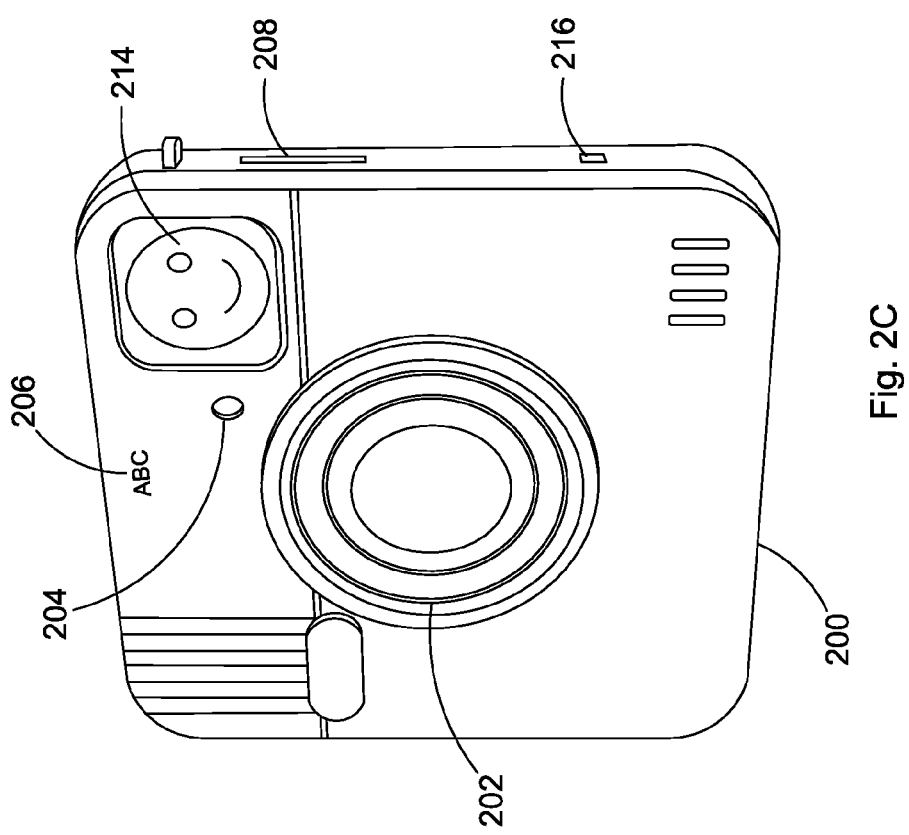

SYSTEM AND METHOD FOR SHARING PHOTOGRAPHIC CONTENT

CROSS REFERENCE TO RELATED APPLICATION

This application claims the priority of U.S. Provisional Application No. 61/814,366, entitled "SYSTEM AND METHOD FOR SHARING PHOTOGRAPHIC CONTENT," filed on Apr. 22, 2013, the disclosure of which is hereby incorporated by reference in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention described herein generally relates to incorporating social networking features into a digital camera.

BACKGROUND OF THE INVENTION

The instant camera was a camera that generated a self-developed film image upon capturing a photograph. One of the most popular types used were formerly made by Polaroid Corporation. Many people have enjoyed seeing their photographs shortly after taking them. However, with the advent and popularity of digital photography, the role of instant cameras has diminished.

Instagram is an online photograph-sharing and social networking service that enables its users to take pictures and share them other social networking services (such as Facebook, Twitter, Tumblr and Flickr). A distinctive feature of Instagram includes formatting photographs into a square shape, similar to a Polaroid picture. Instagram also has the ability and tools to turn a basic and boring picture into a creative masterpiece.

Due to the popularity of the Instagram and its features, many Instagram users have expressed a desire for an "Instagram camera." Nostalgic Polaroid "analog" users and Instagram fans desire a "social camera" that is not a smartphone. There is thus a need to merge elements of social networking and online photograph-sharing into a camera.

SUMMARY OF THE INVENTION

The present invention provides a method and system for sharing photographic content. The method comprises capturing an image on a processing device. A photograph is generated, via the processing device, from the image. Metadata of a user is associated with the photograph and a scannable code corresponding to the metadata is generated. The method further comprises printing, via the processing device, the photograph including the scannable code and an identification of the user on a given social networking site.

According to one embodiment, the method further comprises determining a mood for a given session. The mood may be determined based on at least one of a number of photographs taken, a number of photographs shared, a number of photographs printed, a number of photographs moved, a number of photographs seen, and a number of photographs pointed. The method may further comprise sharing the photograph on one or more social networking sites. Generating the photograph from the image may further comprise applying a photographic filter selected by the user on the image. The scannable code is operable to direct a scanning device to the user on the given social networking site. In another embodiment, the scannable code is operable to direct the scanning device to a plurality of photographs associated with the user on the given social networking site.

The apparatus for sharing photographic content comprises a processor and a memory having executable instructions stored thereon that when executed by the processor cause the processor to capture an image, generate a photograph from the image, associate metadata of a user with the photograph, generate a scannable code corresponding to the metadata, and transmit data including the photograph, metadata and scannable code to a printer to print the photograph including the scannable code and an identification of the user on a given social networking site.

In one embodiment, the processor determines a mood for a given session. The mood may be determined based on at least one of a number of photographs taken, a number of photographs shared, a number of photographs printed, a number of photographs moved, a number of photographs seen, and a number of photographs pointed. The apparatus may include a display configured to display the mood.

The processor may be configured to share the photograph on one or more social networking sites. Generating the photograph from the image may further comprise applying a photographic filter selected by the user on the image. The scannable code is operable to direct a scanning device to the user on the given social networking site. In another embodiment, the scannable code is operable to direct the scanning device to a plurality of photographs associated with the user on the given social networking site.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIGS. 2A, 2B, and 2C illustrate exemplary client devices according to embodiments of the present invention.

DETAILED DESCRIPTION OF THE INVENTION

Figure 1:
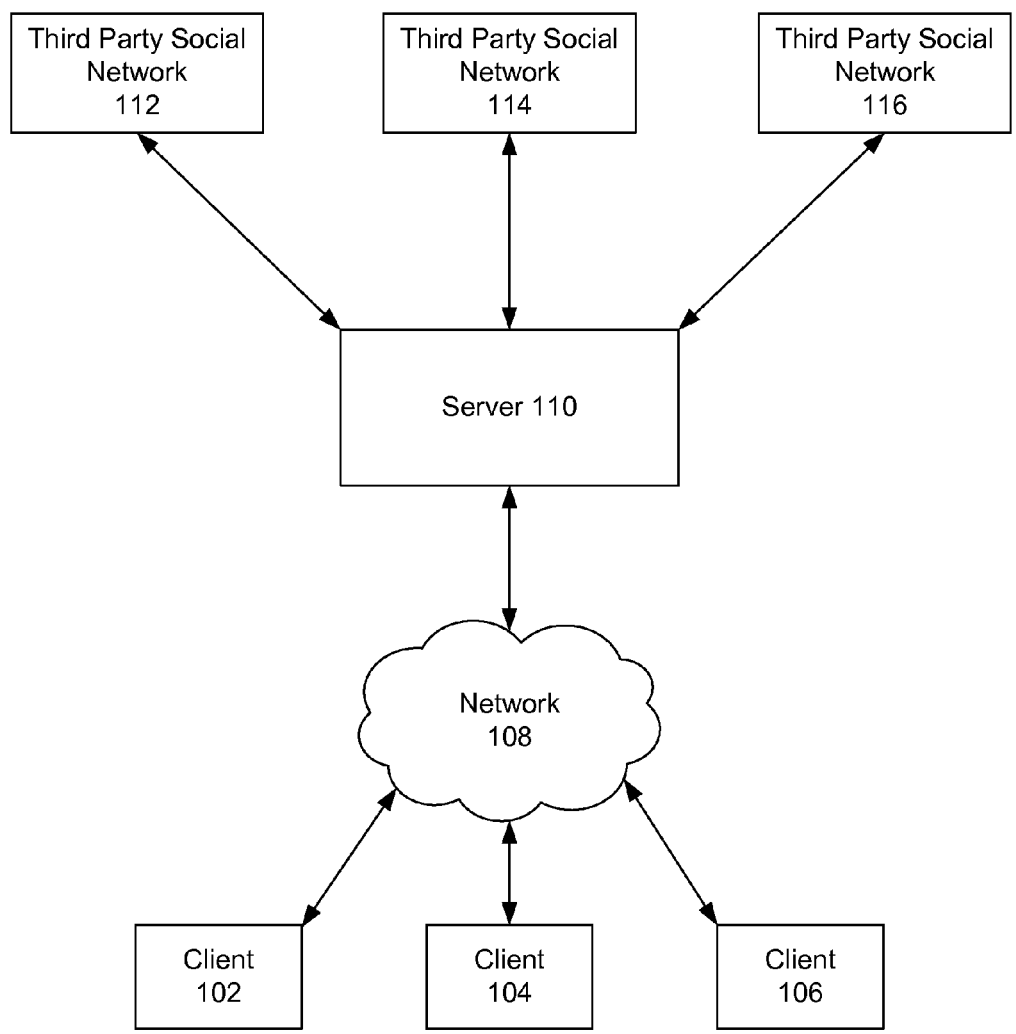
FIG. 1 illustrates a computing system according to an embodiment of the present invention.

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

System 100 includes client 102, client 104, client 106, network 108, server 110, third party social network 112, third party social network 114, and third party social network 116. Client 102, client 104, and client 106 may comprise general purpose computing devices capable of performing camera functions. In addition, the client 102, 104, and 106 may provide photograph printing capabilities. To support the camera and printing features, certain clients may include a paper cartridge, ink cartridge, printer, lenses and flash, shutter and zoom. The clients include one or more central processing units and memory, and are capable of connecting to a network 108. Client 102 may also comprise a graphical user interface (GUI) or a browser application provided on a display (e.g., a touchscreen, LCD or LED display, etc.). Clients 102, 104, and 106 may include Wifi, Near Field Communication (NFC), and Bluetooth capabilities useable by the clients to communicate with each other and/or server 110.

A client device may vary in terms of capabilities or features. Claimed subject matter is intended to cover a wide range of potential variations. For example, a client may include one or more physical or virtual keyboards, mass storage, one or more accelerometers, one or more gyroscopes, global positioning system (GPS) or other location identifying type capability, or a display with a high degree of functionality, such as a touch-sensitive color 2D or 3D display. A client may include or may execute a variety of operating systems, including a personal computer operating system, such as a Windows, Mac OS or Linux, or a mobile operating system, such as iOS, Android, or Windows Mobile, or the like. A client may also include or execute an application to communicate content, such as, for example, textual content, multimedia content, or the like. A client may also include or execute an application to perform a variety of possible tasks, such as browsing, searching, playing various forms of content, including locally stored or streamed video, or images. The foregoing is provided to illustrate that claimed subject matter is intended to include a wide range of possible features or capabilities.

Network 108 may be any suitable type of network allowing transport of data communications across thereof. The network 108 may couple devices so that communications may be exchanged, such as between a server and a client or other types of devices, including between wireless devices coupled via a wireless network, for example, between clients 102, 104, and 106. A network may also include mass storage, such as network attached storage (NAS), a storage area network (SAN), or other forms of computer or machine readable media, for example. In one embodiment, the network may be the Internet, following known Internet protocols for data communication, or any other communication network, e.g., any local area network (LAN), or wide area network (WAN) connection, wire-line type connections, wireless type connections, or any combination thereof.

Server 110 may comprise one or more processing components disposed on one or more processing devices or systems in a networked environment. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like. The server 110 is operative to receive requests from clients 102, 104, and 106 associated with photograph sharing features and to process the requests. According to one embodiment, server 110 is configured to provide a social networking site where users can share photographs taken on client devices 102, 104, or 106. The photographs may be tagged, commented, shared with other users, associated with a location (e.g., geo-tagged), and tracked. Tracking of a photograph is described in further detail with respect to the description of FIG. 10.

A client may include or may execute a variety of possible applications, such as a client software application enabling communication with other devices, such as communicating one or more messages, such as via email, short message service (SMS), or multimedia message service (MMS), including via a network, such as a social network via third party social network 112, 114, or 116. Examples of social networks may include, Instagram, Pinterest, Facebook, LinkedIn, Twitter, Flickr, or Google+, to provide only a few possible examples. The term "social network" refers generally to a network of individuals, such as acquaintances, friends, family, colleagues, or co-workers, coupled via a communications network or via a variety of sub-networks. Social media sites, social networking sites, and social photograph networks are hereby collectively referred to as "social networks" or "social networking sites."

Potentially, additional relationships on a social network may subsequently be formed as a result of social interaction via the communications network or sub-networks. A social network may be employed, for example, to identify additional connections for a variety of activities, including, but not limited to, dating, job networking, receiving or providing service referrals, content sharing, creating new associations, maintaining existing associations, identifying potential activity partners, performing or supporting commercial transactions, or the like. A social network may include individuals with similar experiences, opinions, education levels or backgrounds. Subgroups may exist or be created according to user profiles of individuals, for example, in which a subgroup member may belong to multiple subgroups. An individual may also have multiple "1:few" associations within a social network, such as for family, college classmates, or co-workers.

An individual's social network may refer to a set of direct personal relationships or a set of indirect personal relationships. A direct personal relationship refers to a relationship for an individual in which communications may be individual to individual, such as with family members, friends, colleagues, co-workers, or the like. An indirect personal relationship refers to a relationship that may be available to an individual with another individual although no form of individual to individual communication may have taken place, such as a friend of a friend, or the like. Different privileges or permissions may be associated with relationships in a social network. A social network also may generate relationships or connections with entities other than a person, such as companies, brands, or so called 'virtual persons.' An individual's social network may be represented in a variety of forms, such as visually, electronically or functionally. For example, a "social graph" or "socio-gram" may represent an entity in a social network as a node and a relationship as an edge or a link.

Figure 2B:
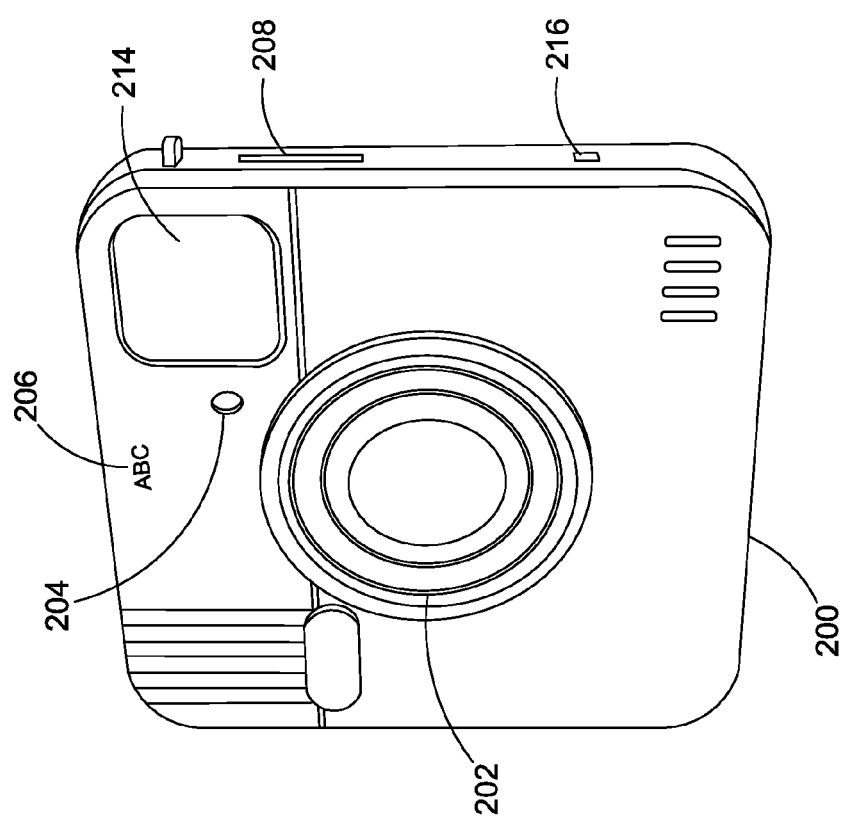

According to one embodiment, a given client may be a digital instant camera that includes the ability to take photographs, view the photographs on the client device, edit the photographs, apply image processing functions, upload or share the photographs on social networks, and print the photographs. The digital instant camera may be branded and designed according to a classic theme (e.g., a Polaroid camera), or a variety of recognizable themes. FIGS. 2A, 2B and 2C present exemplary client devices with Polaroid branding according to one embodiment. A classically-theme branded digital instant camera may provide nostalgia while maintaining aspects of the digital world.

FIG. 2A presents a client device according to one embodiment of the present invention. On the front-facing side of client device 200 includes lens 202, LED flash 204, branding 206, SD card slot 208, ink slot 210, and lens 212. Lens 202 may be an optical lens including both optical and digital zoom capabilities. In one embodiment, lens 202 can be interchanged with different types and sizes of lenses. Branding 206 provides a partner or sponsoring company's logo and may impart a particular style of the client device 200 associated with the company. SD card slot 208 is configured to accept Secure Digital (SD) card memory modules for storage of photographs, information, or other media from client device 200. Ink slot 210 provides a compartment capable of holding one or more ink tanks used for printing photographs on device 200, which is described in further detail with respect to the description of FIG. 6. According to one embodiment, lens 212 may be a secondary lens used for features such as 3D filters, webcam applications, and Quick Response (QR) code capture.

FIG. 2B presents a client device according to another embodiment of the present invention. Front-facing side of client device 200 includes lens 202, LED flash 204, branding 206, SD card slot 208, LCD panel 214, and Universal Serial Bus (USB) slot 216. According to the illustrated embodiment, LCD panel 214 displays a QR code operable for scanning by other client devices. The QR code displayed on LCD panel 214 may include information associated with the client device 200 or of a user of client device 200. In one embodiment, users may log in to client device 200 and assigned unique QR codes. The QR code may be displayed on client device 200 such that it may be pointed with another client device or similar device capable of scanning the QR code. Scanning the QR code allows a person to see one or more photographs associated with client device 200 or the user of client device 200 on a social networking site and/or "follow" the person on the social networking site. USB slot 216 may be used to connect the client device 200 to, for example, a computer or any other USB compatible device to transfer photographs or other media from client device 200.

FIG. 2C presents a client device according to another embodiment of the present invention. Front-facing side of client device 200 includes lens 202, LED flash 204, branding 206, SD card slot 208, LCD panel 214, and USB slot 216. In the illustrated embodiment, LCD panel 214 displays a "mood" of the client device 200 for a given session or duration of time. The mood may be generated by a mood assistant based on a number of photographs taken, shared, printed, moved, seen, and "pointed" (via QR code) by the client device or current user of the client device. The mood assistant may include artificial intelligence similar to that of a Japanese "Tamagotchi." The displayed mood may include a status icon or emoticon such as a sunny, cloudy, happy, or sad image that provides an indication as to the client device's mood.

Figure 3:
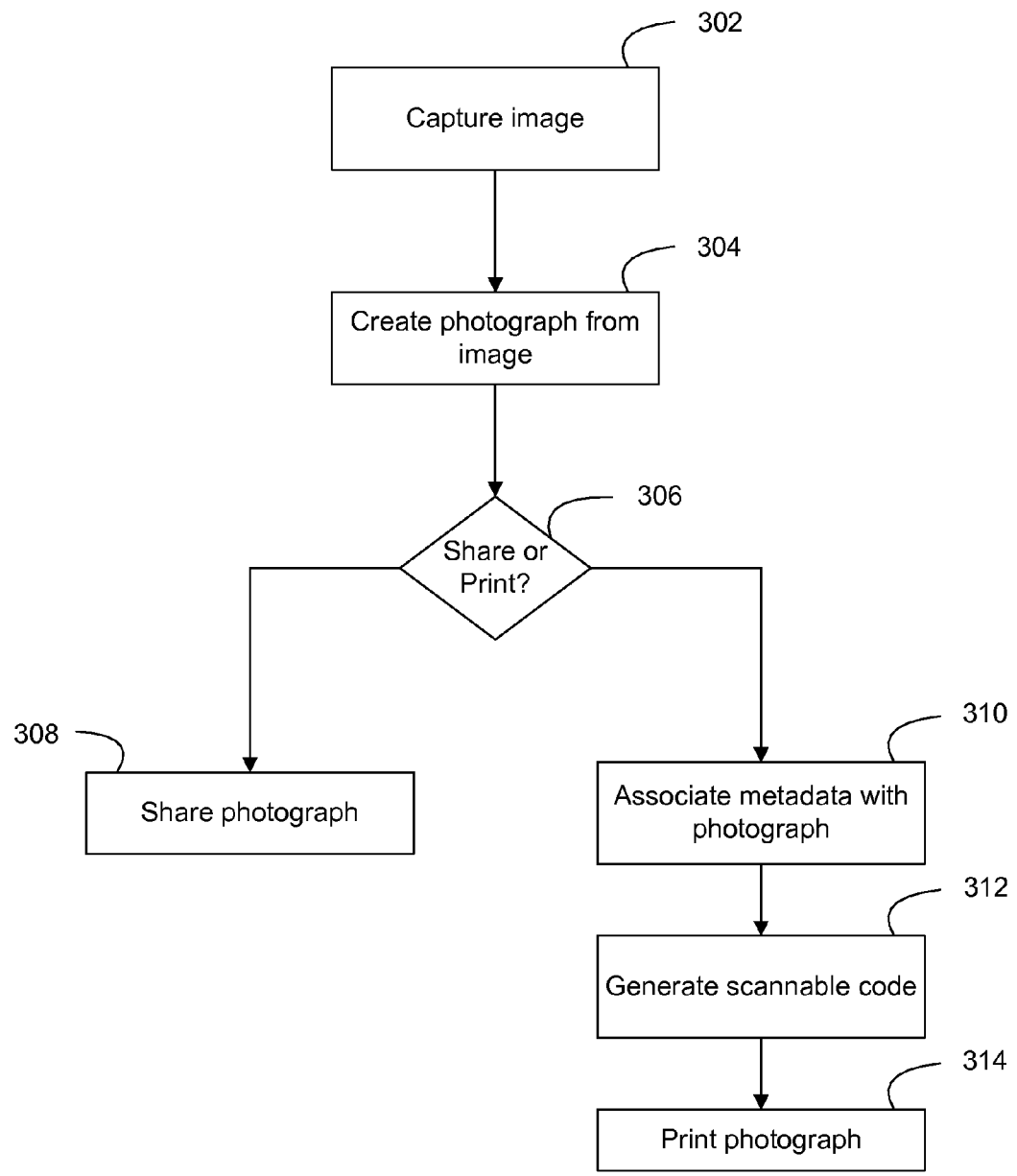
FIG. 3 illustrates a flowchart of a method for sharing photographic content according to an embodiment of the present invention.

FIG. 3 presents a flowchart of a method for sharing photographic content according to an embodiment of the present invention. An image is captured on a client device, step 302. Basic photography features may be available to a user of the client device such as flash, zoom, eye or face tracking, etc. After an image is captured, a photograph is created from the image, step 304. The created photograph may be stored on the client device. A user of the client device may be able to view, delete, edit or process photographs stored on the client device. In one embodiment, creating the photograph includes applying one of a plurality of photographic filters selected by a user of the client device to the image. The photographic filters may be selected from a "standard set" of filters known to one of ordinary skill in the art or provided by a sponsoring company of a branded client device or from an online photograph sharing/social networking service. Photographs stored on the client device may be shared or printed. A determination is made whether a user of the client device has selected to share or print a given photograph, step 306.

The given photograph can be shared upon user selection, step 308. Photographs may be sent, shared, or uploaded from the client device to one or more social networking sites using a network connection. Shared photographs may be posted on one or more social network accounts of the user. The user may tag, comment, email, blog, or post any shared photograph for viewing by one or more users. The photographs may be shared either publicly or privately according to rules configurable by the user. A photograph may also be shared among devices via a private local network (e.g., Wifi), Bluetooth, or NFC technology.

If the user selects to print a photograph, metadata is associated with the photograph, step 310. Photographs, either taken on the client device on retrieved from other client device may be printed on the client device. The metadata may include an ID such as a username or nickname the user who took the photograph, one or more social networking accounts, and geography information. A unique photograph ID may also be generated based on the metadata for each photograph taken on the client device. The geography information may indicate a current user location either entered by the user or obtained via GPS or other location identification technologies. User may have one or more social networking accounts that of which the selected photograph and metadata may be uploaded. If the user does not have an account with a social networking account, the user may be prompted to sign up and create a new account.

In a next step 312, a scannable code is generated. The scannable code is a unique code generated based on the metadata and/or the unique photograph ID. That is, the scannable code will be unique to each photograph and include therein sufficient information to identify the particular photograph when scanned. The photograph is printed in step 314. According to one embodiment, the photograph may be printed in the fashion of a "Polaroid picture."

Figure 4:
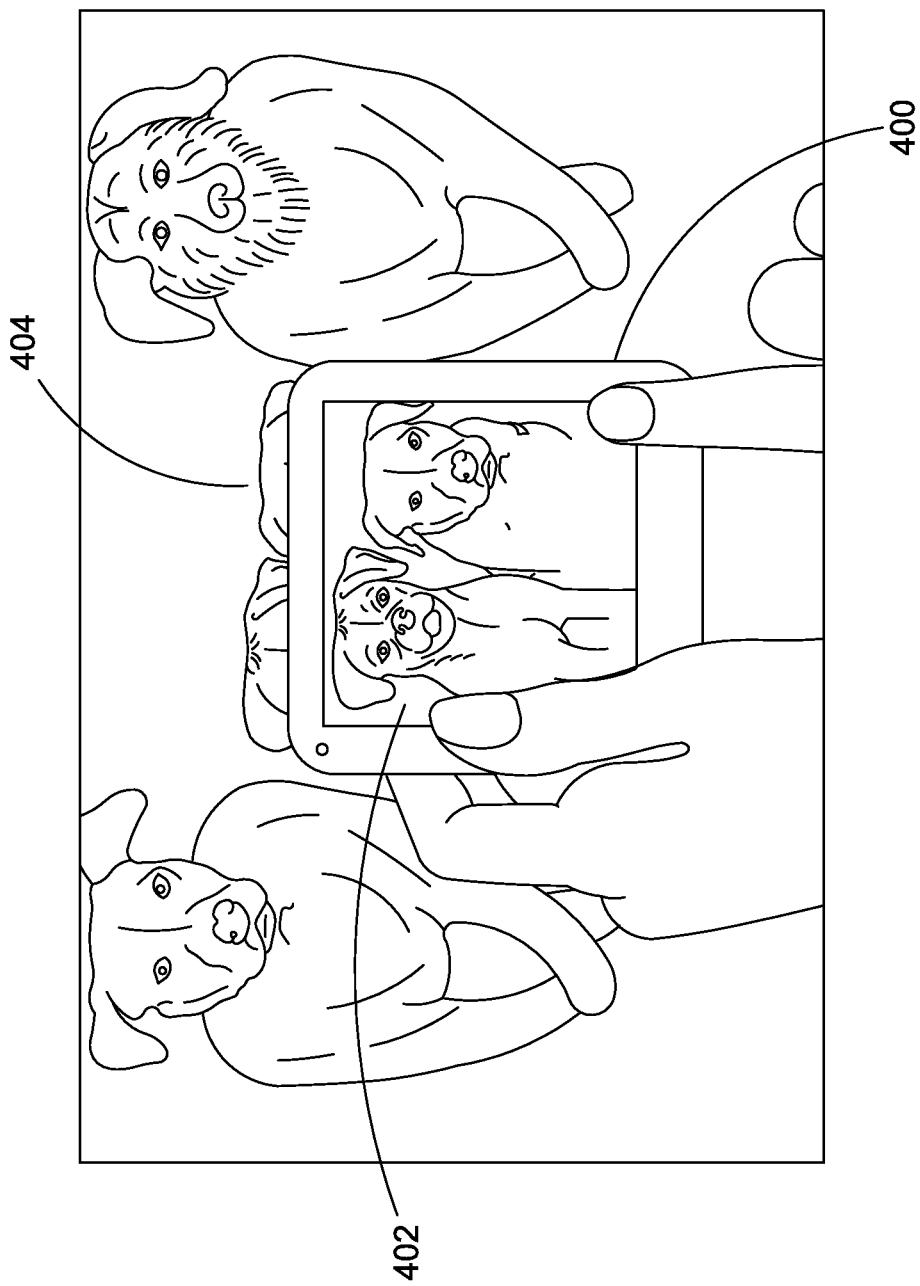
FIG. 4 illustrates capturing an image on a client device according to an embodiment of the present invention.

FIG. 4 presents capturing an image by on a client device according to an embodiment of the present invention. A user may take a photograph of target object 404 using a client device 400. According to one embodiment, photographs may be taken using a shutter button function on LCD display 402. In another embodiment, client device 400 may include a physical shutter button, either alone or in addition to a shutter button function on LCD display 402. Photographs taken with client device 400 may be previewed on LCD display 402.

Figure 5:
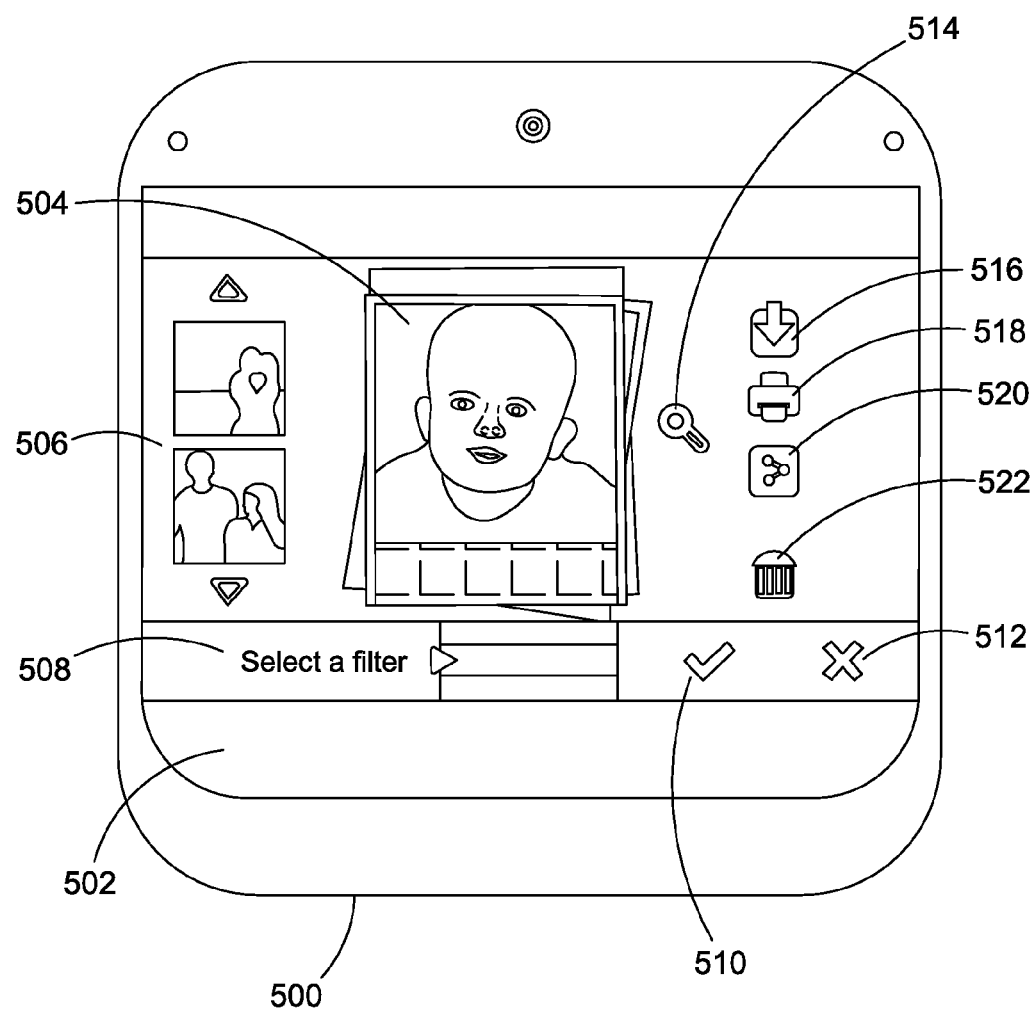
FIG. 5 illustrates a variety of functions on a client device according to an embodiment of the present invention.

FIG. 5 presents a variety of functions on a client device according to an embodiment of the present invention. The rear-facing side of a client device 500 includes a LCD display 502. In accordance with the illustrated embodiment, LCD display 502 includes a photograph viewer 504, photograph navigator 506, filter toggle 508, zoom icon 514, download icon 516, print icon 518, sharing icon 520, and trash icon 522.

Photograph viewer 504 is operable to display photographs taken by or stored on client device 500. Zoom icon 514 may be selected to zoom-in or zoom-out on a photograph displayed on photograph viewer 504. Photograph navigator 506 may be used to navigate or scroll between photographs taken by or stored on client device 500. A user may apply a filter on a given image displayed on photograph viewer. Client device 500 may include a plurality of filters selectable using filter toggle 508. The plurality of filters may be any of standard known to one of ordinary skill in the art or customized photographic filters. A selected filter may be accepted, 510, or canceled, 512.

Figure 6:
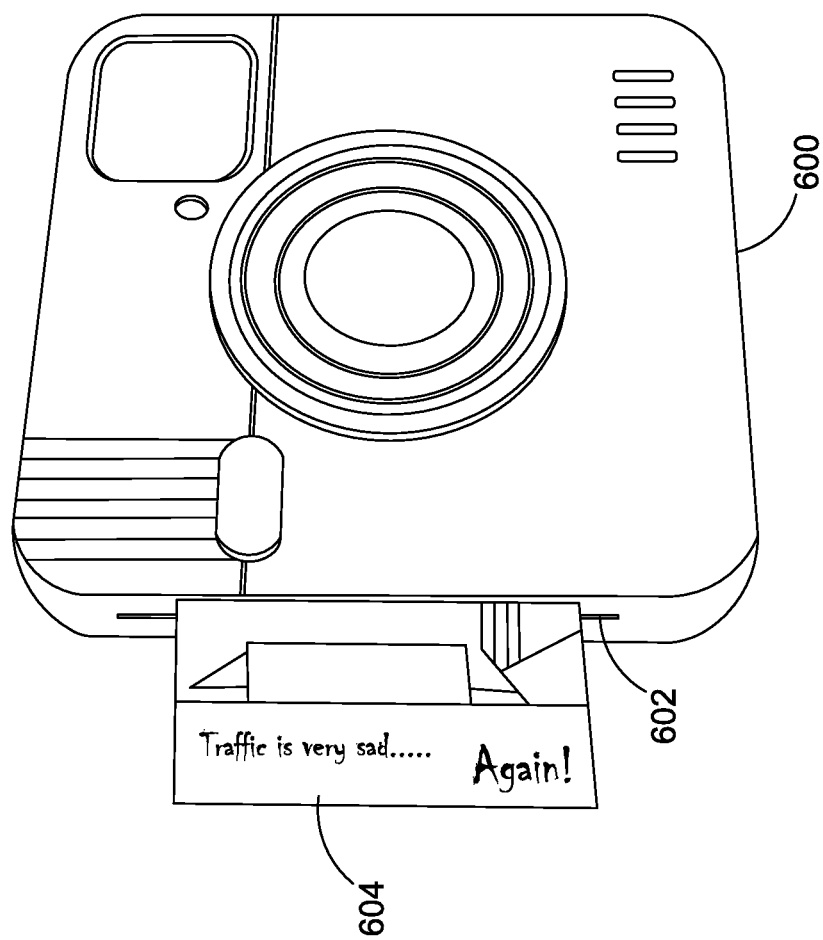
FIG. 6 illustrates an exemplary client device printing a photograph according to one embodiment of the present invention.

LCD display 502 further includes download icon 516, print icon 518, sharing icon 520, and trash icon 522 for downloading/uploading, printing, sharing, and deleting photographs, respectively. Photographs may be downloaded from, for example, social networking, cloud, and storage sites. In one embodiment, photographs may also be downloaded from and uploaded to another similar or different client device via a USB connection. Print icon 518 allows a user to print one or more photographs on client device 500. FIG. 6 presents an exemplary client device printing a photograph according to one embodiment of the present invention. Photograph 604 may be printed out from printer 602 on client device 600.

Referring back to FIG. 5, the print icon 518 may also allow a user to print one or more photographs remotely. Remote photograph printing includes use of third photograph printing services (such as Snapfish, Shutterfly, and Kodak), kiosk printing, and any other printing on a separate or remote device. Sharing icon 520 may be used to share photographs on client device 500 to one or more social networking sites. Photographs may be deleted from client device 500 by selected trash icon 522.

Figure 7:
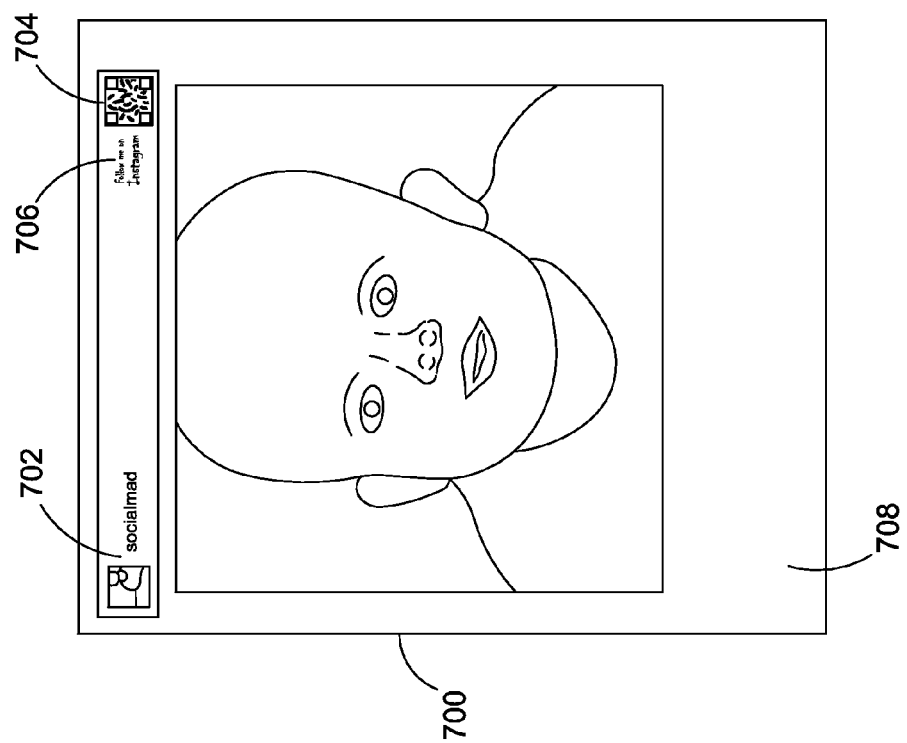
FIG. 7 illustrates an exemplary printed photograph according one an embodiment of the present invention.

An exemplary printed photograph according one an embodiment of the present invention is presented in FIG. 7. A photograph 700 may be printed with the scannable code 704, an identification of the user 702 (such as a username on a social networking account) with the user's avatar or profile picture, and an identification of a social networking site to follow the user 706 (e.g., "Follow me on Instagram"). The scannable code 704 may be printed on the photograph 700 in the form of a 2-D barcode, a QR code, or any other type of barcode. Other users may scan the scannable code 704 via a client device or any device capable of scanning the scannable code 704 to "follow" the user of the photograph, for example, on his/her social networking account(s) or any other web site and view other photographs taken by the user. The printed photograph 700 may also include a blank writeable area 708 under the photograph image where the user can write a message. In another embodiment, the client device may allow a user to input text and print the input text in the blank area. The photograph 700 may be printed on a peelable sticker or a paper with an adhesive backing.

Figure 8:
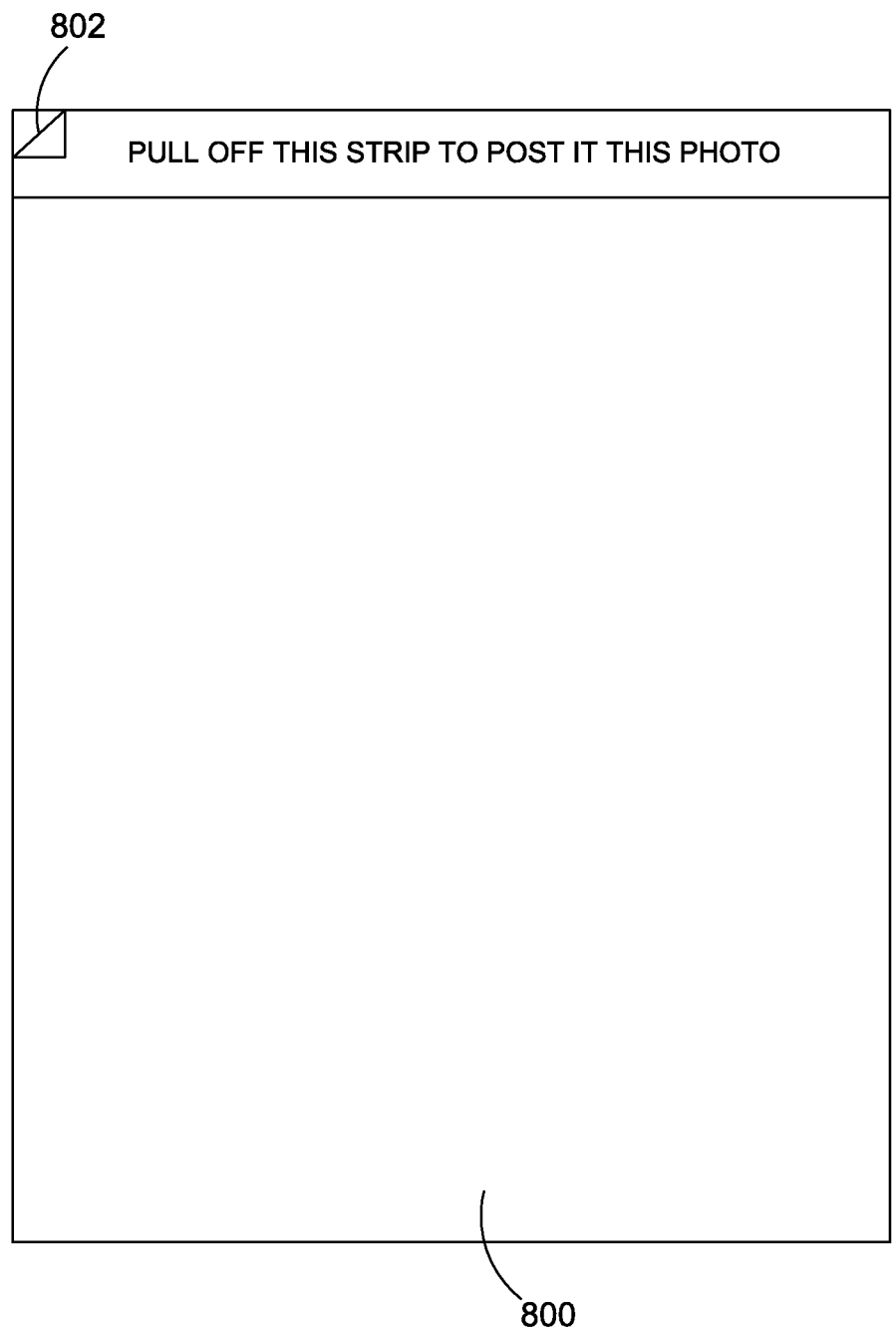
FIG. 8 illustrates an exemplary photograph sticker according to an embodiment of the present invention.
Figure 9:
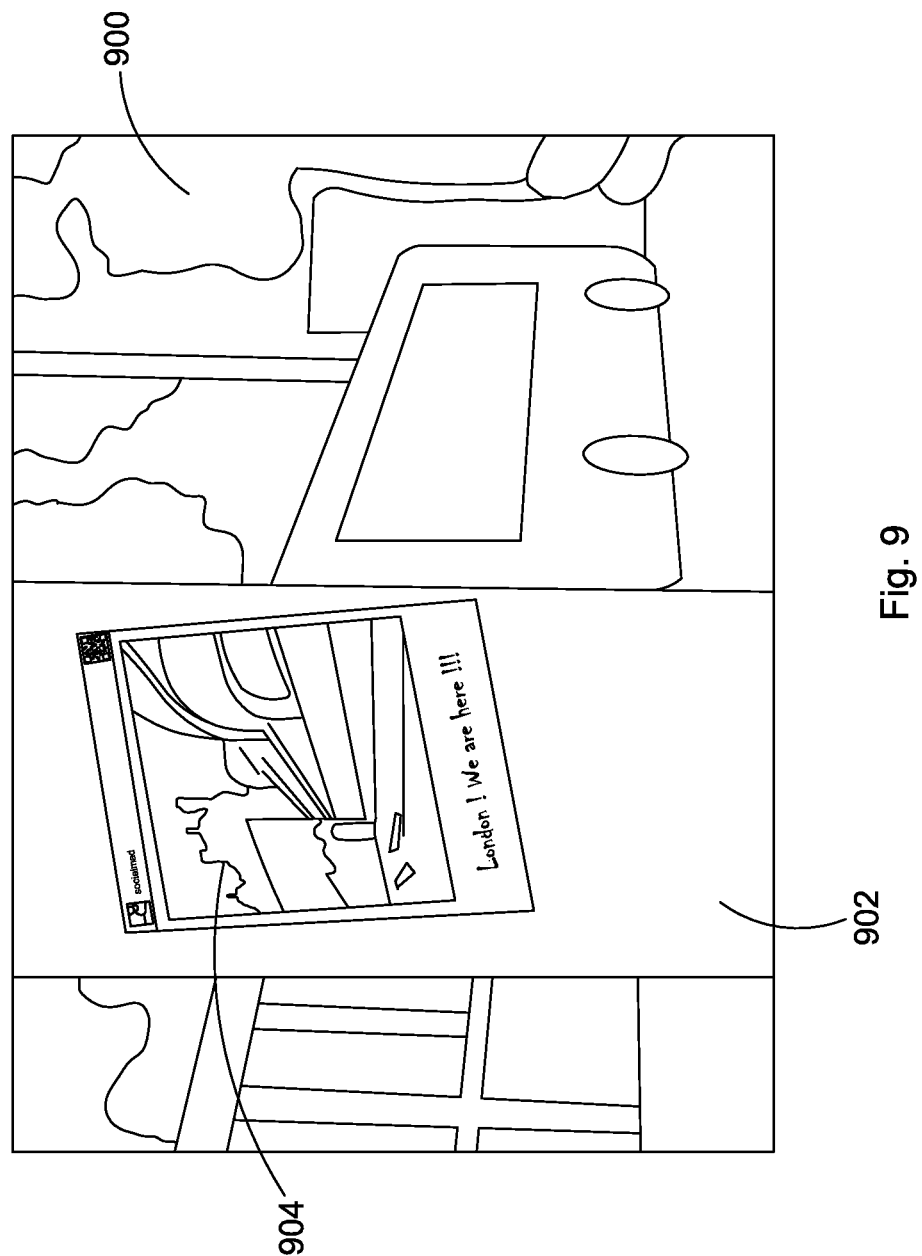
FIG. 9 illustrates an exemplary location for placing a printed photograph according to an embodiment of the present invention.

FIG. 8 presents an exemplary photograph sticker according to an embodiment of the present invention. A sticker backing allows the user to physically adhere, post, or stick the photograph 800 on a surface. The sticker backing may be exposed by peeling on strip 802. As illustrated in FIG. 9, a user may choose to place a photograph 904 on a pole 902 at a given location 900. The scannable code on the photograph 904 allow passerby's who express interest in the photograph 904 to follow and connect to the user's web page, social networking account, or content designated by the user. Like any other social network, the present invention is based around having friends or followers. When a person follows someone, their photographs show up in that person's social network stream or feed, where the person may "like" and/or comment on them. Scanning the scannable code includes reading the scannable code, retrieving an ID and location of the scanning user, and also the information on the scannable code. If the scanning user is not a member of a given social network associated with the photograph, the scanning user may be directed to a web site to sign up for an account and/or app store to download an app to see the photograph online.

Figure 10:
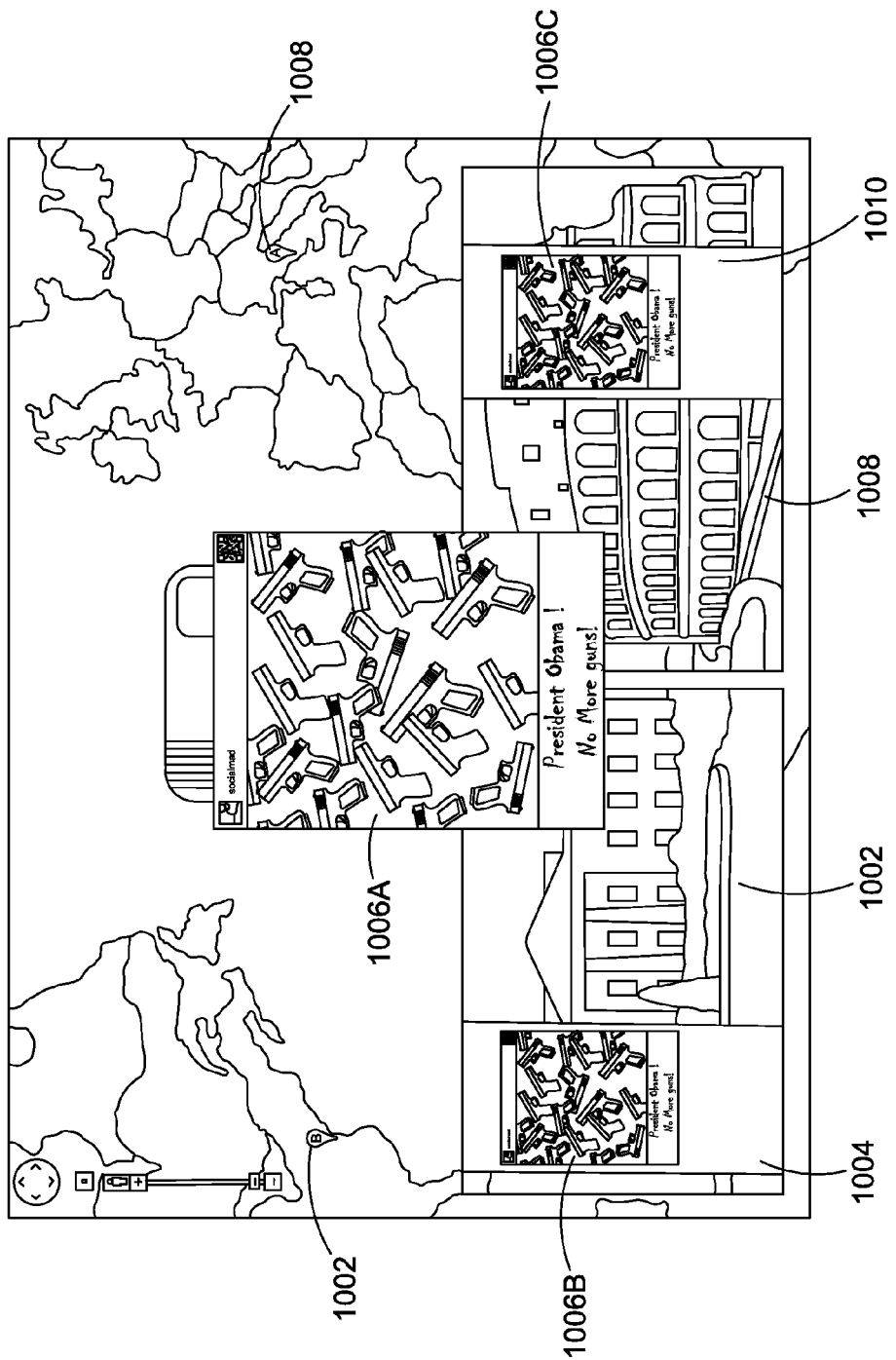
FIG. 10 illustrates an example of a photograph existing or moved to a plurality locations according to an embodiment of the present invention.

FIG. 10 presents an example of a photograph 1006A existing or moved to a plurality locations according to an embodiment of the present invention. A user may have the option to move or "re-shoot" a given photograph in another location 1008 different than from its original location 1002. In the illustrated example, a first instance 1006B of photograph 1006A may be placed on pole 1004 at location 1002 and moved to location 1008 on pole 1010 as a second instance 1006C of photograph 1006A. The user who took the photograph may also log in to the social networking site(s) maintaining the photograph and/or metadata of the photograph to see the photograph as well as determine if the photograph has "moved." The user who took the photograph may track where photographs have been scanned. When a scanning user scans a photograph, the geographical data of the scanning user may be uploaded to the server or social networking site storing the photograph and/or metadata of the photograph. The geographical data of scanning users may be recorded on the server or social networking site where the user may track and review the location of the photograph and scanning users. Users may also link their social networking accounts with friends. Linked members may see where each others' photographs are located.

FIGS. 1 through 10 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A method for sharing photographic content, the method comprising:
    capturing an image on a portable processing device;
    generating, via the portable processing device, a first photograph from the image;
    associating metadata of a user with the first photograph;
    generating a scannable code corresponding to the metadata;
    generating social media content for a photograph feed associated with the first photograph taken with the portable processing device and at least one second photograph taken with another portable processing device, that are shared on a social network, the social media content comprising first geographical location data where the first photograph was taken and second geographical location data where the second photograph was scanned with the portable processing device;
    receiving, at the portable processing device, activity information associated with the at least one second photograph from the another portable processing device, the activity information comprising third geographical location data where the at least one second photograph was taken with the another processing portable device and fourth geographical location data where the at least second photograph was scanned with the another portable processing device, and the activity information indicating that the first photograph moved from a first to a second locations and of the second photograph from a third to a fourth locations based on geographical data where the first and second photographs were scanned;
    displaying on at least one display associated with the portable processing device at least one graphical user interface comprising the photograph feed associated with the first photograph and a photograph feed associated with the at least one second photograph, each of the photographic feeds including details of where the photograph associated with the feed has been seen based at least on geographic location data where the photograph was scanned with another portable processing device; and
    printing, via the portable processing device, the first photograph including the scannable code and a social network's identification of the user.

2. The method of claim 1 further comprising the portable processing device determining a mood of the portable processing device for a given session.

3. The method of claim 2 wherein the mood of the portable processing device is determined based on at least one of a number of photographs taken, a number of photographs shared, a number of photographs printed, a number of photographs moved, a number of photographs seen, and a number of photographs pointed.

4. The method of claim 1 further comprising sharing the photograph on one or more social networking sites.

5. The method of claim 1 wherein generating the photograph from the image further comprises applying a photographic filter selected by the user on the image.

6. The method of claim 1 wherein the scannable code is operable to direct a scanning device to the user on the given social networking site.

7. The method of claim 6 wherein the scannable code is operable to direct the scanning device to a plurality of photographs associated with the user on the given social networking site.

8. A portable apparatus for sharing photographic content, the portable apparatus comprising:
- a processor;
- an embedded printer; and
- a memory having executable instructions stored thereon that when executed by the processor cause the processor to:
- capture an image;
- generate a first photograph from the image;
- associate metadata of a user with the first photograph;
- generate a scannable code corresponding to the metadata;
- generate social media content for a photograph feed associated with the first photograph taken with the portable processing device and at least one second photograph taken with another portable processing device, that are shared on a social network, the social media content comprising first geographical location data where the first photograph was taken and second geographical location data where the second photograph was scanned with the portable processing device;
- receive, at the portable processing device, activity information associated with the at least one second photograph from the another portable processing device, the activity information comprising third geographical location data where the at least one second photograph was taken with the another processing portable device and fourth geographical location data where the at least second photograph was scanned with the another portable processing device, and the activity information indicating that the first photograph moved from a first to a second locations and of the second photograph from a third to a fourth locations based on geographical data where the first and second photographs were scanned;
- display on at least one display associated with the portable processing device at least one graphical user interface comprising the photograph feed associated with the first photograph and a photograph feed associated with the at least one second photograph, each of the photographic feeds including details of where the photograph associated with the feed has been seen based at least on geographic location data where the photograph was scanned with another portable processing device; and
- transmit data including the first photograph, metadata and scannable code to the embedded printer to print the first photograph including the scannable code and a social network's identification of the user.

9. The portable apparatus of claim 8 wherein the processor determines a mood of the portable processing device for a given session.

10. The portable apparatus of claim 9 wherein the mood of the portable processing device is determined based on at least one of a number of photographs taken, a number of photographs shared, a number of photographs printed, a number of photographs moved, a number of photographs seen, and a number of photographs pointed.

11. The portable apparatus of claim 9 including a display configured to display the mood of the portable processing device.

12. The portable apparatus of claim 8 wherein the processor shares the photograph on one or more social networking sites.

13. The portable apparatus of claim 8 wherein generating the photograph from the image further comprises applying a photographic filter selected by the user on the image.

14. The portable apparatus of claim 8 wherein the scannable code is operable to direct a scanning device to the user on the given social networking site.

15. The portable apparatus of claim 14 wherein the scannable code is operable to direct the scanning device to a plurality of photographs associated with the user on the given social networking site.

* * * * *